(12) United States Patent
Yuan et al.

(10) Patent No.: US 12,061,815 B2
(45) Date of Patent: Aug. 13, 2024

(54) METHOD FOR LOCATING HARD DISK, SYSTEM AND SERVER

(71) Applicant: Fulian Precision Electronics (Tianjin) Co., LTD., Tianjin (CN)

(72) Inventors: Jie Yuan, Tianjin (CN); Shi-Qi Chen, Tianjin (CN)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 44 days.

(21) Appl. No.: 17/985,041

(22) Filed: Nov. 10, 2022

(65) Prior Publication Data

US 2024/0020044 A1 Jan. 18, 2024

(30) Foreign Application Priority Data

Jul. 15, 2022 (CN) .......................... 202210836838.9

(51) Int. Cl.
*G06F 3/06* (2006.01)

(52) U.S. Cl.
CPC .......... *G06F 3/0653* (2013.01); *G06F 3/0604* (2013.01); *G06F 3/0689* (2013.01)

(58) Field of Classification Search
CPC ..... G06F 3/0653; G06F 3/0604; G06F 3/0689
See application file for complete search history.

(56) References Cited

U.S. PATENT DOCUMENTS

| | | | |
|---|---|---|---|
| 7,107,534 B1* | 9/2006 | de Jong | H04L 67/1097 715/969 |
| 9,336,111 B1* | 5/2016 | King | G06F 11/3031 |
| 2012/0317357 A1* | 12/2012 | Kopylovitz | G06F 3/0632 711/E12.001 |
| 2016/0127167 A1* | 5/2016 | Chou | H04L 41/0226 709/223 |
| 2017/0185355 A1* | 6/2017 | Yen | G06F 3/0653 |
| 2021/0057001 A1* | 2/2021 | Nelogal | G06F 3/0631 |
| 2023/0195671 A1* | 6/2023 | Wang | G06F 13/385 710/305 |

FOREIGN PATENT DOCUMENTS

| | | |
|---|---|---|
| TW | 201723836 | 7/2017 |
| TW | 202020607 | 6/2020 |

* cited by examiner

*Primary Examiner* — Edward J Dudek, Jr.
(74) *Attorney, Agent, or Firm* — ScienBiziP, P.C.

(57) ABSTRACT

A method for locating a hard disk applied in a server which governs many hard disks including some making use of one HD slot by an expander customizes the SCSI Enclosure Services (SES) custom page of an expander of a JBOD device, and obtains and stores information of the JBOD device through the expander. The server further obtains information of a hard disk to be located, and obtains information of the JBOD device hosting the hard disk to be located according to the information of the hard disk to be located.

14 Claims, 5 Drawing Sheets

METHOD FOR LOCATING HARD DISK, SYSTEM AND SERVER

This application claims priority to Chinese Patent Application No. 202210836838.9 filed on Jul. 15, 2022, in China National Intellectual Property Administration, the contents of which are incorporated by reference herein.

FIELD

The subject matter herein generally relates to a storage field, in particular, relates to a method for locating hard disk, a system for locating hard disk, and a server.

BACKGROUND

With a rapid development of cloud computing centers, cloud storage, and big data, users' demand for data storage is increasing, and server management requirements are becoming higher. In general, a server with a Host Bus Adapter (HBA) card connected to a Just Bunch of Disks (JBOD) can carry more than 100 hard disks. One JBOD usually uses multiple Serial Attached SCSI (SAS) expanders to expand SAS channels. The hard disks connected to the SAS expanders often use consecutive slot numbers for unique identification in the JBOD, such as Slot0, Slot1 . . . -Slot100, and each slot number corresponds to one physical slot, which allows easy maintenance of the hard disk later. In order to expand the storage capacity of the server, a one-to-many system architecture is formed in which multiple HBA cards are connected to multiple high-density storage expansion cabinets under one server, such as one-to-two, one-to-eight, etc. At this time, the slot numbers under the system will be repeated, there may be such as more than one Slot0. The slot number is no longer unique, and there will be difficulties in locating the hard disk.

The existing method for locating the hard disk is to use continuous slot numbers in a single JBOD and facilitate a search by lighting up the indicator light of a hard disk, which can quickly locate the position of the hard disk in the JBOD. However, in a structure where one server is connected to multiple JBODs, the hard disk cannot practically be located by the slot number. Lighting up the hard disk to locate the corresponding hard disk is necessary, and it is also necessary to remove the covers of multiple JBODs connected to the server, and find the hard disk which is illuminated in the hard disk cluster. The above method for locating the hard disk is cumbersome and inefficient, and cannot meet the customer's requirements for the convenience of server management.

BRIEF DESCRIPTION OF THE DRAWINGS

Implementations of the present disclosure will now be described, by way of embodiment, with reference to the attached figures.

DETAILED DESCRIPTION

Figure 1:
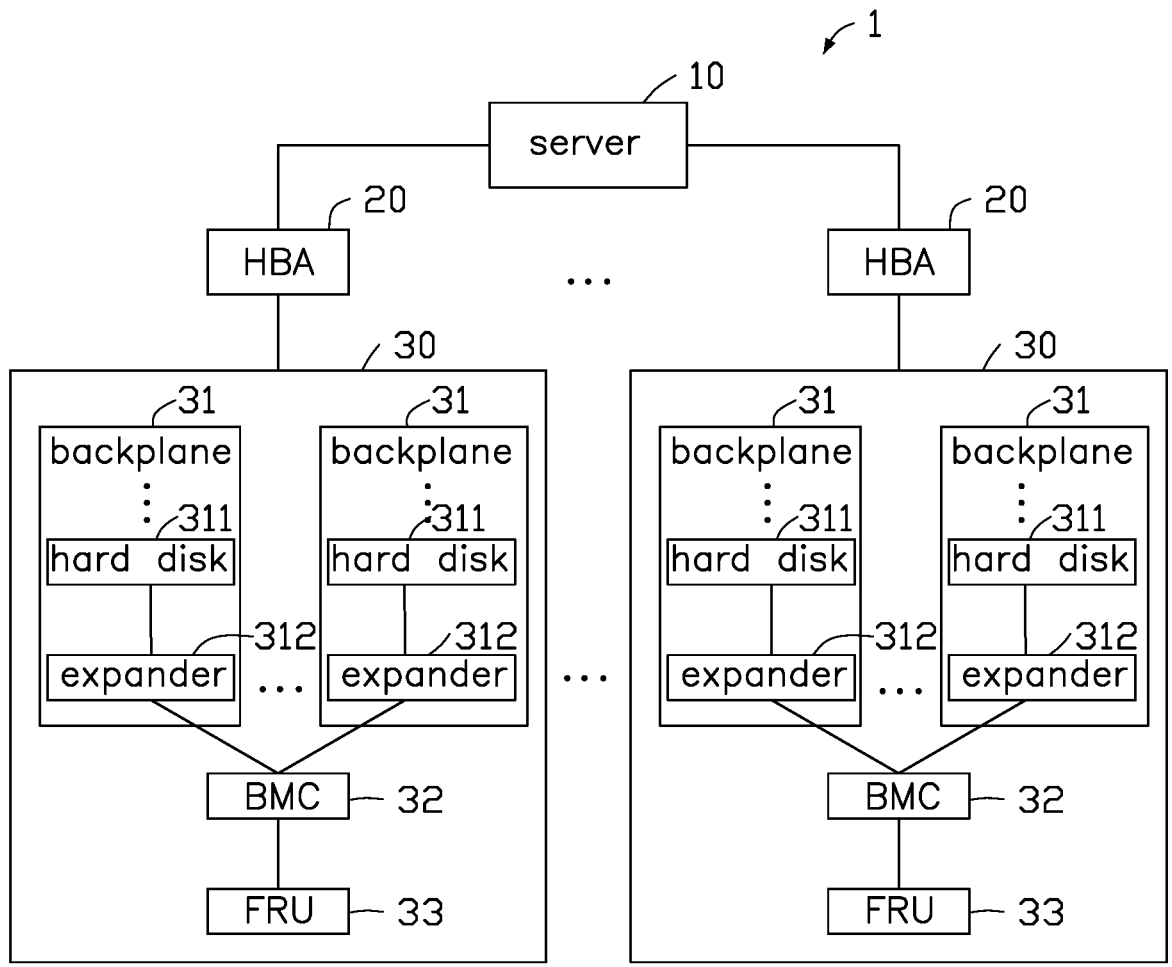
FIG. 1 is a structure schematic diagram of one embodiment of a system for locating hard disk.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The present disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one".

The term "module", as used herein, refers to logic embodied in hardware or firmware, or to a collection of software instructions, written in a programming language, such as, Java, C, or assembly. One or more software instructions in the modules can be embedded in firmware, such as in an EPROM. The modules described herein can be implemented as either software and/or hardware modules and can be stored in any type of non-transitory computer-readable medium or other storage device. Some non-limiting examples of non-transitory computer-readable media include CDs, DVDs, BLU-RAY, flash memory, and hard disk drives. The term "comprising" means "including, but not necessarily limited to"; it specifically indicates open-ended inclusion or membership in a so-described combination, group, series, and the like.

FIG. 1 illustrates the system for locating a hidden hard disk. The system 1 for locating hard disk includes a server 10, a Host Bus Adapter (HBA) 20 and a Just Bunch of Disks (JBOD) device 30. In one embodiment, a number of HBAs 20 are connected to the server 10. The HBA 20 is connected to the JBOD device 30.

In one embodiment, each JBOD device 30 allows installation of multiple hard disks 311 to expand a storage space of the server 10. In one embodiment, the server 10 can obtain information of any one of the hard disks 311 in the multiple JBOD devices connected to the server 10 by executing certain commands.

The JBOD device 30 includes a Baseboard Management Controller (BMC) 32 and a Field Replace Unit (FRU) 33. The FRU 33 is used to store the information of corresponding JBOD device 30. In one embodiment, the information of the JBOD device 30 includes, for example, Manufacturer, Serial Number (SN), Product Number (PN). The BMC 32 is connected to the FRU 33 by an Inter-Integrated Circuit (I2C) bus. In one embodiment, the FRU 33 can also be an Electrically Erasable Programmable read only memory (EEPROM).

In one embodiment, the JBOD device 30 includes a number of backplanes 31, each hard disk backplane 31 is provided with a number of slots for installing the hard disks 311, and each backplane 31 sets an expander 312 on the hard disk. The hard disks 311 set on the backplane 31 are connected to the corresponding expander 312.

In one embodiment, the expander 312 is connected to the BMC 32 by the I2C bus to establish communication between the expander 312 and the BMC 32, so that the expander 312 can obtain information of the JBOD device 30 stored in the FRU 33 by the BMC 32. In one embodiment, after the expander 312 is connected to the BMC 32 by the I2C bus, the BMC 32 is taken as a master control module of the I2C bus, and the expander 312 is taken as a slave module of the I2C bus. The BMC 32 can send information of the JBOD device 30 stored in the FRU 33 to the expander 312 by an I2C bus command, and then the expander 312 receives and saves the information of the JBOD device 30 after receiving the I2C bus command sent by the BMC 32.

In one embodiment, before the expander 312 obtains information of the JBOD device 30, an SCSI Enclosure Services (SES) custom page of the expander 312 needs to be customized, and then the expander 312 stores the information of the JBOD device 30 in the SES custom page. In one embodiment, the SES is the hardware control command service supported by the server 10.

In one embodiment, when any one of the hard disks 311 installed in the multiple JBOD devices connected to the server 10 needs to be located, the server 10 obtains the information of the hard disk to be located, and executes commands according to the information of the hard disk 311 to be located, and obtains the information of the JBOD device 30 stored in the expander 312 connected to such hard disk 311, namely, it obtains the information of the JBOD device 30 where such hard disk 311 is located. Therefore, the actual location of the locatable hard disk 311 is realized, the operation and maintenance cost is reduced, and a repair efficiency for the hard disks is improved.

Figure 2:
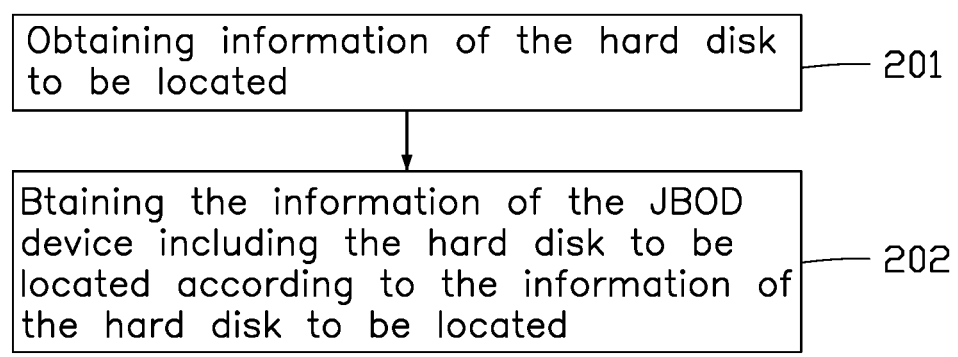
FIG. 2 is a flowchart of one embodiment of a method for locating hard disk.

FIG. 2 illustrates the method for locating hard disk. The method is provided by way of example, as there are a variety of ways to carry out the method. Each block shown in FIG. 2 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 201.

At block 201, obtaining information of the hard disk to be located.

In one embodiment, in the server, the information of the hard disk to be located can include for example, drive letter, SCSI number, serial number, etc. of the hard disk, can be automatically obtained by a program running in the server.

Figure 3:
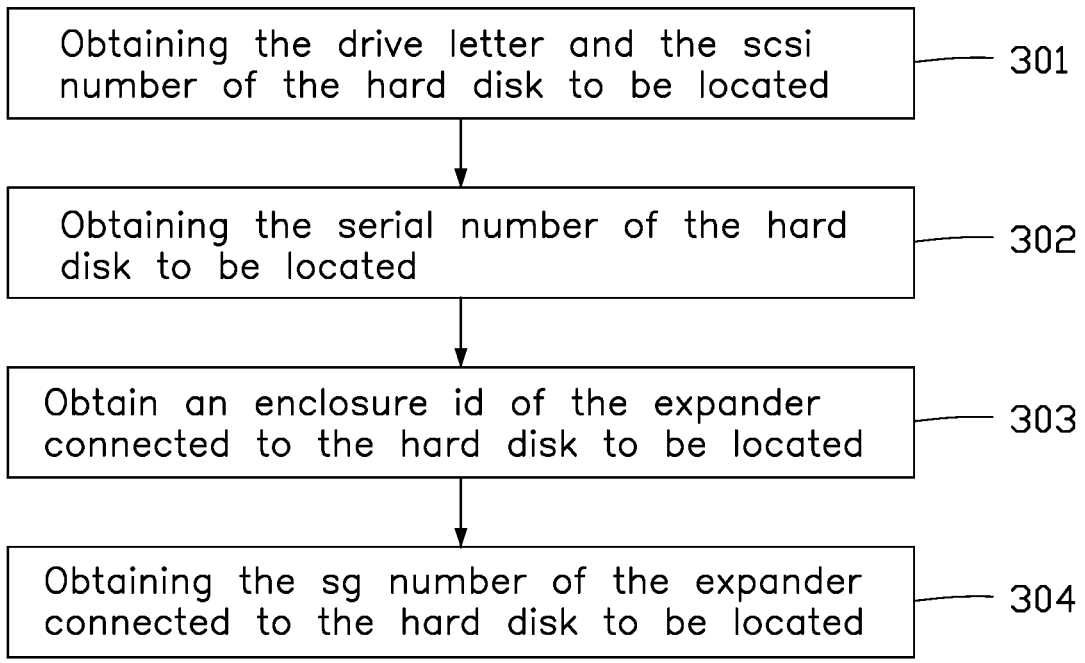
FIG. 3 is a flowchart of another embodiment of the method for locating hard disk.

Referring to FIG. 3, obtaining the information of the hard disk to be located includes blocks 301, 302, 303, and 304.

At block 301, obtaining the drive letter and the SCSI number of the hard disk to be located.

In one embodiment, when a prompt caused by hard disk error (for example, interface error, disk dropped) appears in the server 10 (for example, the server sending a log), the server 10 automatically obtains the drive letter and the SCSI number of the hard disk to be located, from the information in the prompt issued by the server 10.

For example, the server 10 can obtain, according to log content, that the drive letter of the hard disk to be located is sdd, and the SCSI number is 14:0:9:0, when a log sent by the server 10 is as shown below:

[487876.813716] sd14:0:9:0:device block ' handle (0x0014);
[487879.312996] sd14:0:9:0:device unblock and setting to running ' handle(0x0014);
[487879.313210] sd14:0:9:0: [sdd] tag #0 FAILED Result:hostbyte=DID_NO_CONNECT driverbyte=DRIVER OK.

In one embodiment, when all the hard disks 311 in the JBOD device 30 connected to the server 10 are running normally, the server 10 executes LSSCSI command to obtain the drive letter and the SCSI number of the hard disk to be located.

At block 302, obtaining the serial number of the hard disk to be located.

In one embodiment, after the server 10 obtains the drive letter and the SCSI number of the hard disk to be located, the server 10 executes smartctl—l/dev/sdd| grep "Serial Number" command to obtain the serial number of the hard disk to be located.

In one embodiment, the serial number of the hard disk is unique, and further, the serial number of the hard disk to be located can be recorded. The recorded serial number can be compared with the serial number of the hard disk found by subsequent positioning to determine whether the search is correct.

At block 303, obtain an enclosure ID of the expander 312 connected to the hard disk to be located.

In one embodiment, the server 10 executes LSSCSI-Lt 14:0:9:0 | grep "enclosure identifier" command according to the drive letter and the SCSI number of the hard disk to be located, and obtains the enclosure ID of the expander 312 connected to the hard disk to be located.

In one embodiment, the JBOD device 30 sets a number of backplanes 31, and each backplane 31 defines a number of installation slots for hard disks 311, and each backplane 31 sets the expander 312, and the number of the hard disks 311 installed on the backplane 31 are connected to the corresponding expanders 312. In one embodiment, the enclosure ID of the hard disk is an SAS address of an SCSI Management Protocol Initiator (SMPI) in the expander 312 directly connected to the hard disk.

At block 304, obtaining the sg number of the expander 312 connected to the hard disk to be located.

In one embodiment, after obtaining the enclosure ID of the expander 312 connected to the hard disk to be located, the server 10 executes LSSCSI-gt | grep "0x500001234567897f" | awk'{pirntf$NF} command according to the enclosure ID of the expander 312 connected to the hard disk to be located, and obtains the sg number of the expander 312 connected to the hard disk to be located.

In one embodiment, the sg number of the expander 312 connected to the hard disk to be located is the sg number of the expander 312 corresponding to the SAS Address obtained in block 303.

At block 202, obtaining information of the JBOD device 30 including the hard disk to be located according to the information of the hard disk to be located.

In one embodiment, information as to the hard disk to be located may be the sg number of the expander 312 connected to the hard disk to be located in block 304.

In one embodiment, after the server 10 obtains the sg number of the expander 312 connected to the hard disk to be located, the server 10 executes the sg_ses command (for example, sg_ses-p 0x10/dev/sgX) to access the expander 312 and then obtain the information of the SES custom page of the expander 312. Information of the JBOD device 30 stored in the SES custom page is obtained, namely the information of the JBOD device 30 where the hard disk to be located is located. In one embodiment, after the server 10 obtains the information of the JBOD device 30 including the hard disk to be located, the server 10 determines the position of the JBOD device 30 including the hard disk to be located according to the information of the JBOD device 30, and the slot in the JBOD device 30 where the hard disk to be located is actually installed.

Figure 4:
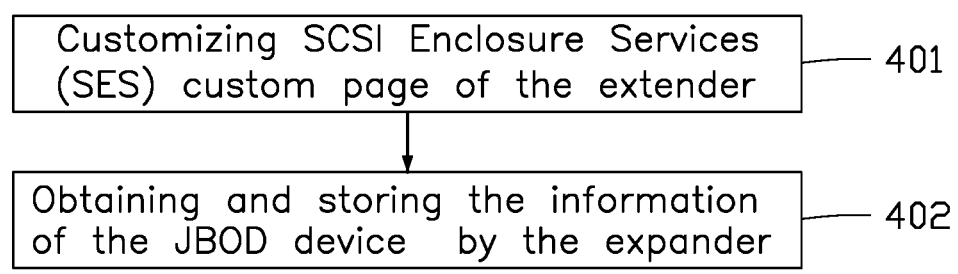
FIG. 4 is a flowchart of another embodiment of the method for locating hard disk.

FIG. 4 illustrates a flowchart of another embodiment of the method for locating hard disk. The method can begin at block 401.

At block 401, customizing SCSI Enclosure Services (SES) custom page of the expander 312.

In one embodiment, the server 10 customizes the SES custom page of the expander 312 by running related programs, and stores the information of the JBOD device 30 corresponding to the expander 312.

At block 402, obtaining and storing the information of the JBOD device 30 by the expander 312.

In one embodiment, the BMC 32 and the FRU 33 in the JBOD device 30 are connected. In one embodiment, the information of the JBOD device 30 is stored in the FRU 33. In one embodiment, by establishing a communication between the expander 312 and the BMC 32, the expander 312 obtains the information of the JBOD device 30 stored in the FRU 33 by the BMC 32, and stores the information of the JBOD device 30 in the SES custom page.

In one embodiment, the expander 312 and the BMC 32 are connected by an IC2 bus. In one embodiment, the expander 312 sends an I2C command to the BMC 32 and controls the BMC 32 to obtain the information of the JBOD device 30 stored in the FRU 33, and then the expander 312 obtains the information of the JBOD device 30 from the BMC 32.

Figure 5:
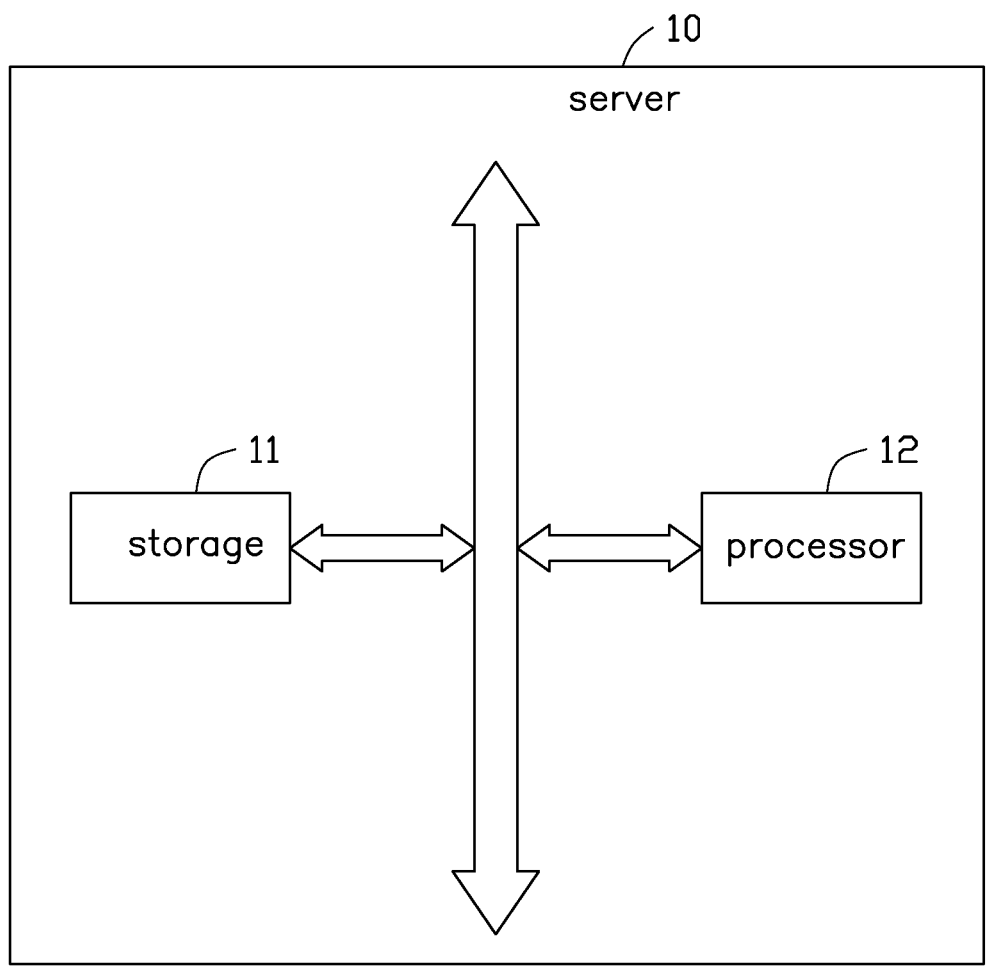
FIG. 5 is a structure schematic diagram of one embodiment of a server.

FIG. 5 illustrates the server 10. The server 10 includes a storage 11 and at least one processor 12.

In one embodiment, the server 10 includes a terminal that can automatically perform numerical calculation and/or information processing according to pre-set or stored instructions, the hardware of the terminal includes, but is not limited to, microprocessors, application-specific integrated circuits, programmable gate arrays, digital processors, and embedded devices.

In one embodiment, the storage 11 is used to store computer programs and various data. The storage 11 may include a Read-Only Memory (ROM), a Random Access Memory (RAM), a Programmable Read-Only Memory (PROM), an Erasable Programmable Read-Only Memory (EPROM), a One-time Programmable Read-Only Memory (OTPROM), an Electronically Erasable Programmable Read-Only Memory (EEPROM), a Compact Disc Read-Only Memory (CD-ROM), or other optical disk storage, magnetic disk storage, magnetic tape storage, or any other computer-readable medium that can be used to carry or store data.

In one embodiment, the processor 12 may include integrated circuits, such as a single packaged integrated circuit, or multiple integrated circuits packaged with the same function or different functions, including a general-purpose central processing unit (CPU), a microprocessor, a digital processing chip, a graphics processor, or a combination of various control chips, etc. The processor 12 executes various functions of the server 10 and processes data by running or executing the computer program stored in the storage 11 and calling up the data stored in the storage 11, such as executing the LSSCSI command to obtain the drive letter and the SCSI number of the hard disk to be located.

The embodiments of the present disclosure also provide a storage medium. The storage medium includes instructions to enable the server 10 to execute the method for locating hard disk in the above embodiments of the present disclosure.

Under the present disclosure, the SES custom page of the expander 312 is customized, and a connection established between the expander 312 and the BMC 32, the expander 312 obtains the information of the JBOD device 30 by the BMC 32, and stores the information of the JBOD device 30 in the SES custom page. Then, information of the hard disk is obtained according to the prompting of the server 10 and input commands in the server 10, and the JBOD device 30 including the hard disk is determined by information of the hard disk to be located, thereby the slot where the hard disk is installed in the JBOD device 30 is determined. Therefore, the position of one or any locatable hard disk is realized, the operation and maintenance cost is reduced, and the repair efficiency of the hard disk is improved.

The exemplary embodiments shown and described above are only examples. Even though numerous characteristics and advantages of the present disclosure have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims.

What is claimed is:

1. A system for locating hard disk comprising:
   a plurality of Just Bunch of Disks (JBOD) devices;
   a server connected to the plurality of JBOD devices, wherein each of the plurality of JBOD devices installs hard disks to expand a storage space of the server, each of the plurality of JBOD devices comprises expanders, each of the expanders is connected to a hard disk, and each of the expanders stores information of a corresponding one of the plurality of JBOD devices, wherein each of the plurality of JBOD devices comprises a Baseboard Management Controller (BMC) and a Field Replace Unit (FRU) for storing the information of a corresponding JBOD device, the BMC is connected to the FRU by an Inter-Integrated Circuit (I2C) bus, each of the expanders obtains the information of the corresponding JBOD device stored in the FRU by the BMC, and stores the information of the corresponding JBOD device in a SCSI Enclosure Services (SES) custom page;
   the server obtains an information of a hard disk to be located among the hard disks connected the plurality of expanders, and accesses the corresponding expander according to the information of the hard disk to be located, and obtains the information of the SES custom page of the corresponding expander, and obtains the information of the corresponding JBOD device stored in the SES custom page, determines a position of the corresponding JBOD device comprising the hard disk to be located, and a position of a slot in the corresponding JBOD device where the hard disk to be located is specifically installed according to the information of the corresponding JBOD device.

2. The system as claimed in claim 1, wherein the system further comprises a Host Bus Adapter (HBA), and the server is connected to the plurality of JBOD devices by the HBA.

3. The system as claimed in claim 1, wherein the server obtains a serial number of the hard disk to be located, and obtains an enclosure ID of the corresponding expander connected to the hard disk to be located according to the serial number of the hard disk; the server is further configured to obtain a number of the expander connected to the hard disk to be located according to the enclosure ID of the corresponding expander; the server searches for the corresponding expander connected to the hard disk to be located according to the number of the corresponding expander connected to the hard disk to be located; after the server obtains the number of the corresponding expander connected to the hard disk to be located, the server accesses the expander, and obtains the information of the SES custom page of the corresponding expander, and obtains the information of the corresponding JBOD device stored in the SES custom page; the server determines a position of the corresponding JBOD device comprising the hard disk to be located, and a position of a slot in the corresponding JBOD device where the hard disk to be located is specifically installed according to the information of the corresponding JBOD device.

4. The system as claimed in claim 3, wherein the enclosure ID is a Serial Attached SCSI (SAS) address of a SCSI Management Protocol Initiator (SMPI) in the corresponding expander.

5. The system as claimed in claim 3, wherein the corresponding JBOD device sets backplanes, and each of the backplanes defines slots for installing the hard disks, and each of the backplanes sets the expanders, and the hard disks installed on each of the backplanes are connected to the expanders.

6. The system as claimed in claim 1, wherein the information of the corresponding JBOD device comprises a manufacturer, a serial number and a product name of the corresponding JBOD device.

7. A method for locating hard disk comprising:
customizing SCSI Enclosure Services (SES) custom page of an expander of a JBOD device;
obtaining and storing information of the JBOD device by the expander, comprising: obtaining the information of the JBOD device stored in a Field Replace Unit (FRU) by a Baseboard Management Controller (BMC), and storing the information of the JBOD device in the SES custom page, the BMC being connected to the FRU by an Inter-Integrated Circuit (I2C) bus;
obtaining information of a hard disk to be located; and
obtain the information of the JBOD device comprising the hard disk to be located according to the information of the hard disk to be located, comprising: accessing the expander according to the information of the hard disk to be located, and obtaining the information of the SES custom page of the expander, and obtaining the information of the JBOD device stored in the SES custom page, determining a position of the JBOD device comprising the hard disk to be located, and a position of a slot in the JBOD device where the hard disk to be located is specifically installed according to the information of the JBOD device.

8. The method as claimed in claim 7, further comprising:
obtaining a serial number of the hard disk to be located;
obtaining an enclosure ID of the expander connected to the hard disk to be located; and
obtaining a number of the expander connected to the hard disk to be located according to the enclosure ID of the expander.

9. The method as claimed in claim 8, further comprising:
after obtaining the number of the expander connected to the hard disk to be located, accessing the expander, and obtaining the information of the SES custom page of the expander, and obtain the information of the JBOD device stored in the SES custom page.

10. The method as claimed in claim 7, wherein the information of the corresponding JBOD device comprises a manufacturer, a serial number and a product name of the corresponding JBOD device.

11. A non-transitory storage medium having stored thereon instructions that, when executed by at least one processor of a server, causes the least one processor to execute instructions of locating hard disk, the instructions comprising:
customizing SCSI Enclosure Services (SES) custom page of an expander of a JBOD device;
obtaining and storing information of the JBOD device by the expander, comprising: obtaining the information of the JBOD device stored in a Field Replace Unit (FRU) by a Baseboard Management Controller (BMC), and storing the information of the JBOD device in the SES custom page, the BMC being connected to the FRU by an Inter-Integrated Circuit (I2C) bus;
obtaining information of a hard disk to be located; and
obtain the information of the JBOD device comprising the hard disk to be located according to the information of the hard disk to be located, comprising: accessing the expander according to the information of the hard disk to be located, and obtaining the information of the SES custom page of the expander, and obtaining the information of the JBOD device stored in the SES custom page, determining a position of the JBOD device comprising the hard disk to be located, and a position of a slot in the JBOD device where the hard disk to be located is specifically installed according to the information of the JBOD device.

12. The non-transitory storage medium as recited in claim 11, wherein the instructions further comprising:
obtaining a serial number of the hard disk to be located;
obtaining an enclosure ID of the expander connected to the hard disk to be located; and
obtaining a number of the expander connected to the hard disk to be located according to the enclosure ID of the expander.

13. The non-transitory storage medium as recited in claim 12, wherein the instructions further comprising:
after obtaining the number of the expander connected to the hard disk to be located, accessing the expander, and obtaining the information of the SES custom page of the expander, and obtain the information of the JBOD device stored in the SES custom page.

14. The non-transitory storage medium as recited in claim 11, wherein the information of the corresponding JBOD device comprises a manufacturer, a serial number and a product name of the corresponding JBOD device.

* * * * *